United States Patent [19]

Christenson

[11] 4,157,287

[45] Jun. 5, 1979

[54] METHOD OF ASSISTING PILE DRIVING BY ELECTRO-OSMOSIS

[76] Inventor: Lowell B. Christenson, 7410 Thurow, Houston, Tex. 77087

[21] Appl. No.: 936,981

[22] Filed: Aug. 25, 1978

[51] Int. Cl.² .............................................. B01D 13/02
[52] U.S. Cl. ........................... 204/180 R; 204/299 R; 166/248; 175/19; 405/232; 405/228
[58] Field of Search ....................... 204/180 R, 299 R; 405/232, 228; 166/248; 175/19

[56] References Cited

U.S. PATENT DOCUMENTS

| | | | |
|---|---|---|---|
| 4,046,657 | 9/1977 | Abbott | 204/180 R |
| 4,119,511 | 10/1978 | Christenson | 204/180 R |

OTHER PUBLICATIONS

Nikolaev, "Pile Driving By Electro-osmosis" Consultants Bureau, 1962.

*Primary Examiner*—Arthur C. Prescott
*Attorney, Agent, or Firm*—Fulbright & Jaworski

[57] ABSTRACT

A method of assisting the driving of a hollow electrically conductive pile into soil containing water by electro-osmosis in which the pile is insulated on the outside with an electrical non-conductor. An electrical circuit having a d-c power source, an anode, and a cathode is provided in which the anode is placed in the water outside of the hollow pile and the cathode is attached to the electrically conductive pile. When the pile is in contact with the soil, electrical power is applied to the circuit whereby water will be caused to move from the anode down the outside of the pile through the soil adjacent the pile and towards the cathode making the pile easier to drive through the soil. In addition, after the pile has been driven, the current is reversed through the electrical circuit for reducing the water content of the soil inside the pile and increasing the load bearing strength of the soil.

3 Claims, 2 Drawing Figures

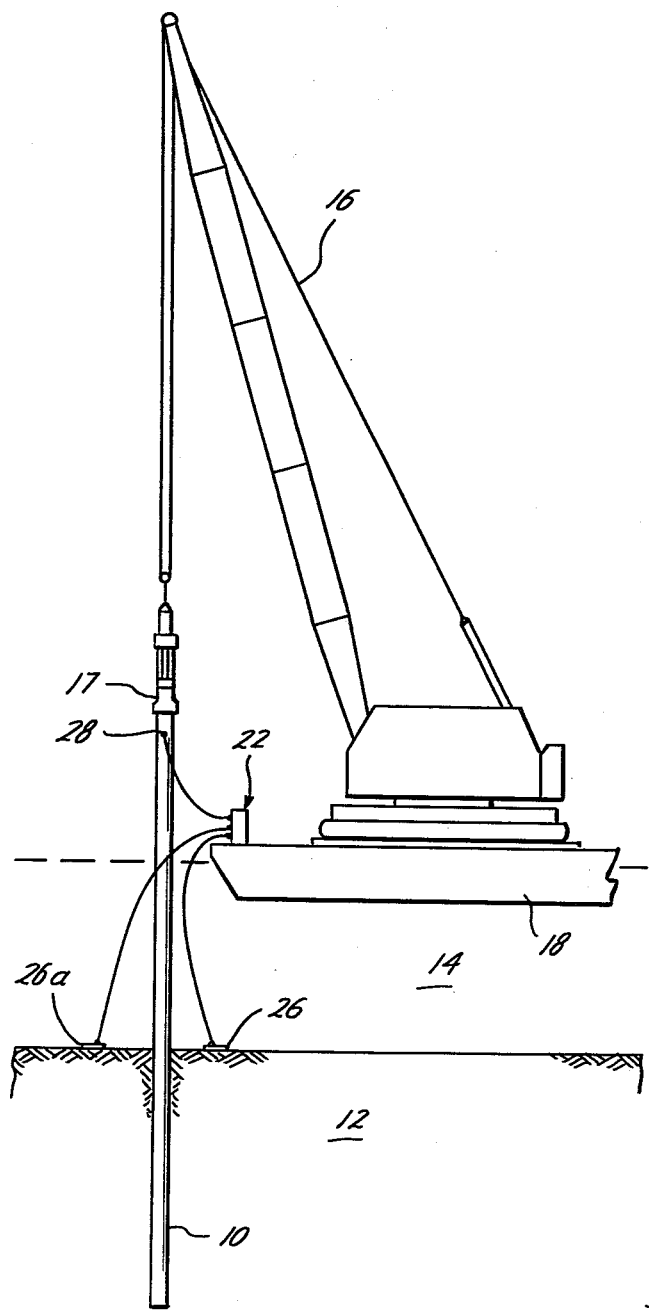
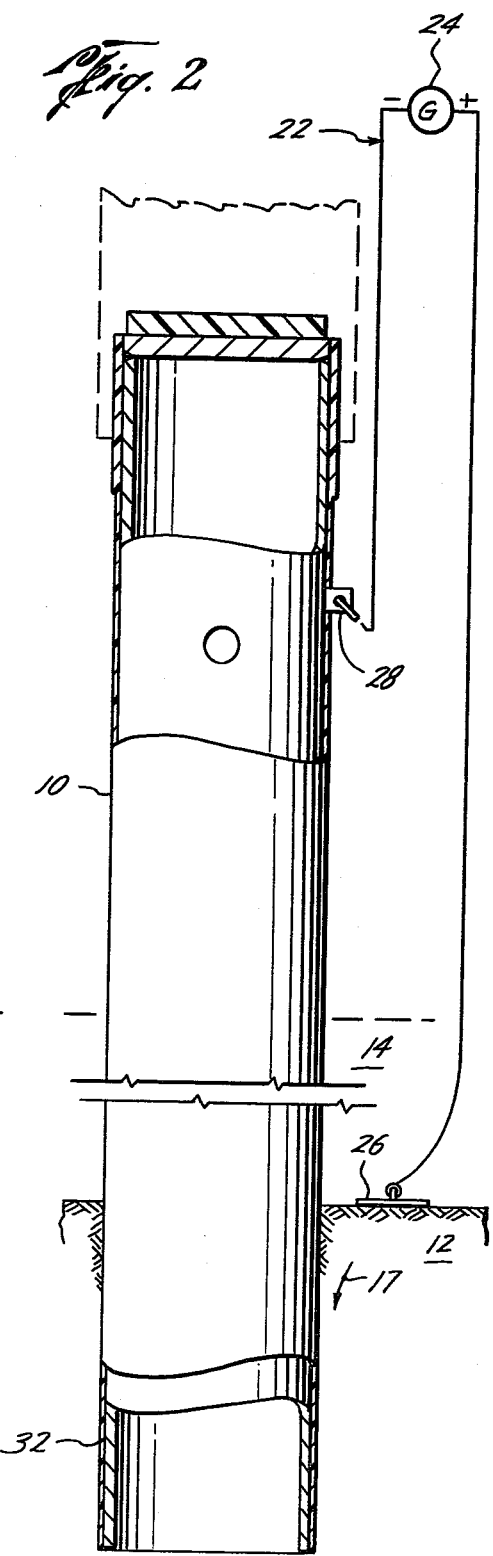

METHOD OF ASSISTING PILE DRIVING BY ELECTRO-OSMOSIS

BACKGROUND OF THE INVENTION

The use of electro-osmosis to assist in the driving of an electrically conductive pile is shown in U.S. Pat. No. 4,046,657 in which the pile is coated with a non-conductive insulator on the inside and electrical current is transmitted down the interior of the pile. However, coating the inside of a pile is expensive, difficult to apply, and is difficult to test and repair. Furthermore, the total adhesion and shear resistance of the soil is greater on the outside of the pile and it is more important to direct the current and thus the water along the outside of the pile for wetting the soil on the outside of the pile.

The present invention is directed to an improved method of assisting pile driving by electro-osmosis by insulating the pile on the outside with an electrical non-conductor in order to save time and expense, and to direct current downwardly along the outside of the pile to be driven easier through the soil by increasing the water content adjacent the outer surface of the pile at the location where the total resistance to driving is the greatest.

SUMMARY

The present invention is directed to a method of assisting the driving of the hollow electrically conductive pile into the soil containing water by insulating the pile on the outside with an electrical non-conductor. An electrical circuit having an anode, a d-c power source, and a cathode is provided in which the anode is placed in the water outside of the hollow pile and the cathode is attached to the electrically conductive pile. When the pile is placed in contact with the soil, electrical power is applied to the circuit whereby the water outside of the pile will be caused to move down the outside of the pile through the soil adjacent the pile toward the cathode making the pile easier to drive through the soil. In addition, after the pile has been driven, the current flow through the electrical circuit is reversed for reducing the water content of the soil adjacent the pile thereby consolidating the soil and increasing the load bearing strength of the soil.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is an elevational and schematic view of a pile driver driving a pile into the soil below a body of water, and FIG. 2 is an enlarged elevational view, partly in cross section, of a pile being driven utilizing the present invention.

DESCRIPTION OF THE PREFERRED EMBODIMENT

For purposes of illustration, the present invention will be described in conjunction with driving a pile 10 into a soil 12 containing water, such as being below the surface of water 14, such as the ocean. The pile 10 may be driven by any suitable type of pile driver 16 such as one mounted on a floating barge 18.

While the present invention is applicable to assisting the driving of various shapes of hollow conductive piles, the invention will be described, for purposes of illustration only, of assisting in the driving of a circular, hollow, electrically conductive pile, typically a hollow steel pile. The pile 10 is driven into the soil by the pile driver 16 impacting an anvil 17. However, when the pile 10 is driven into the soil 12, which has any significant clay content, soil is encountered having a minimum of moisture content and it becomes increasingly difficult to drive the pile 10 because of the adhesion and shear strength of the soil 12, particularly on the outside of the pile 10. The present invention utilizes the principle of electro-osmosis by providing an electrical current path which will move water into the soil 12 into which the pile is driven at the location where the total adhesion and total shear resistance of the soil are greatest, on the outside of the pile 10, which acts to decrease the shear strength of the soil and thereby reduce the total resistance on the outside of the pile whereby the pile 10 may be more easily driven.

Referring now to FIG. 2, the pile 10 is shown in position in contact with and being driven into the soil 12. The electro-conductive pile 10 is provided with a coating 32 which may be of any suitable electrical non-conductor such as polyurethane or epoxy. In particular, a polyurethane insulating coating sold under the trade name Zebron or an epoxy such as Colebrand of ten to twenty mils thickness are satisfactory. The coating being applied to the outside may be easily applied, is less expensive to apply, and is in a position whereby it may be easily tested and repaired. This is of particular advantage when add-ons to the pile are made in the field and the continuity of the coating across the welded joint must be reestablished. Furthermore, the electrical insulated coating 32, by being on the outside of the pile, will allow the electrical current to move water along the outside of the pile at the location of the greatest total resistance to the driving of the pile through the soil 12.

An electrical current, generally indicated by the reference numeral 22, is provided having a conventional and reversible d-c power source 24, one or more anodes 26 and 26a, and a cathode 28 to provide an electrical path down along the outside of the pile 10 for moving water into the soil adjacent the outside of the pile at the location in which the pile 10 is being driven. The anodes 26 and 26a are placed outside of the pipe 10 in the water 14 and the cathode 28 is electrically connected to the electrically conductive pile 10, preferably above the surface of the water 14. Since the ocean water 14 is salt water, the water 14 is a suitable electrolyte and an electrical circuit is formed between the anodes 26 and 26a along the exterior of the pipe to the inside of the electrically conductive pipe 10.

In operation, with the pile 10 in contact with the soil 12, electrical power is supplied by the elctrical power source 24 between one or more anodes 26 and 26a and the cathode 28 through the electrically conductive pipe 10. In this manner, a potential difference is set up between the water 14 on the outside of the pile 10 and the electrically conductive pile 10. This causes the water 14 on the outside of the pile to migrate, as indicated by the arrow 17, downwardly on the exterior of the pile 10 along the coating 32 at the area of greatest total resistance to the driving of the pile towards the bottom of the pile 10 and towards the cathode 28. When the pile 10 is in the soil, the effect will be to loosen the adhesion of the clay to the outside surface of the pile 10 and to decrease the shear strength of the soil, particularly adjacent the outside walls of the pile 10 and also to some extent on the inside of the pile 10 due to the increase in the water content resulting from the migration of water down the outside of the pile 10 towards the bottom of the pile 10. This will make the pile 10 easier to drive through the soil 12 by the pile driver 16.

The principle of electro-osmosis is reversible in that once the polarity of the electrical circuit is reversed, the soil 12 can be dried out and its strength and adhesion properties can be retained or even improved. Therefore, the present method includes, after the pile 10 has been driven to its desired depth, of reversing the current flow in the electrical circuit 22 for reducing the water content of the soil 12 adjacent the pile 12 and increasing the load bearing strength of the soil 12.

The present invention, therefore, is well adapted to carry out the objects and attain the ends and advantages mentioned as well as others inherent therein. While a presently preferred embodiment of the invention is given for the purpose of disclosure, numerous changes in the details of construction, and steps of the process will readily suggest themselves to those skilled in the art and which are encompassed within the spirit of the invention and the scope of the appended claims.

What is claimed is:

1. A method of assisting the driving of a hollow electrically conductive pile, which is coated on the outside with an electrical non-conductor, into soil containing water comprising, placing an anode of an electrical circuit having an anode, a d-c power source, and a cathode, in the water outside of the hollow pile, attaching the cathode to the electrically conductive pile, when the pile is in contact with the soil applying electrical power to the circuit whereby water will be caused to move down the outside of the pile through the soil adjacent the pile and towards the inside of the pile making the pile easier to drive through the soil.

2. A method of assisting the driving of a hollow electrically conductive pile into soil containing water comprising, insulating the pile on the outside with an electrical non-conductor, placing an anode of an electrical circuit having an anode, a d-c power source, and a cathode, in the water outside of the hollow pile, attaching the cathode to the electrically conductive pile, when the pile is in contact with the soil applying electrical power to the circuit whereby water will be caused to move down the outside of the pile through the soil adjacent the pile towards the cathode making the pile easier to drive through the soil.

3. The method of claim 2 including, after the pile has been driven, reversing the current flow through the electrical circuit for reducing the water content of the soil adjacent the pile and increasing the load bearing strength of the soil.

* * * * *